United States Patent [19]

Cuevas

[11] Patent Number: 5,058,921
[45] Date of Patent: Oct. 22, 1991

[54] LINEAR BILATERAL INFLATOR MODULE

[75] Inventor: Jess Cuevas, Scottsdale, Ariz.

[73] Assignee: Talley Automotive Products, Inc., Phoenix, Ariz.

[21] Appl. No.: 445,231

[22] Filed: Dec. 4, 1989

[51] Int. Cl.$^5$ ............................................. B60R 21/16
[52] U.S. Cl. ..................................... 280/741; 280/736
[58] Field of Search ............... 280/730, 729, 728, 736, 280/737, 740, 741

[56] References Cited

U.S. PATENT DOCUMENTS

| | | | |
|---|---|---|---|
| 3,411,808 | 11/1968 | Chute | 280/737 |
| 3,880,447 | 4/1975 | Thorn et al. | 280/740 |
| 4,068,862 | 1/1978 | Ishi et al. | 280/740 |
| 4,131,299 | 12/1978 | Ono et al. | 280/736 |
| 4,547,342 | 10/1985 | Adams et al. | 280/741 |
| 4,561,675 | 12/1985 | Adams et al. | 280/741 |
| 4,578,247 | 3/1986 | Bolieau | 280/741 |
| 4,590,041 | 5/1986 | Hill | 280/741 |
| 4,711,466 | 12/1987 | Breed | 280/741 |
| 4,722,551 | 2/1988 | Adams | 280/736 |

*Primary Examiner*—Richard A. Berisch
*Attorney, Agent, or Firm*—Tarolli, Sundheim & Covell

[57] ABSTRACT

A linear bilateral inflator module in which the inflator component of the module has two opposed cylindrical combustion chambers mounted in a horizontal plane at either end of the inflator. These chambers are joined to and supported by a central T-shaped inflator housing containing an ignitor for initiating combustion of the propellant within the inflator. The lower leg of this central section is configured as a tubular extension which may optionally be joined to a separate conduit member adapted for permitting a reciprocal fluid flow into and out of the air bag through the inflator. The extension also serves as a point of attachment for an outer surrounding base plate assembly. A bead, located within the mouth portion of the air bag, is trapped between the inflator and the base plate during formation of the structural seal between these components such that the inflator is completely enclosed within the bag. The inflator is adapted to provide differing amounts of a gaseous combustion product from each of the combustion chambers by varying the amount or type of propellant stored therein. This arrangement permits the development within the air bag component of the module of two different inflation zones.

30 Claims, 3 Drawing Sheets

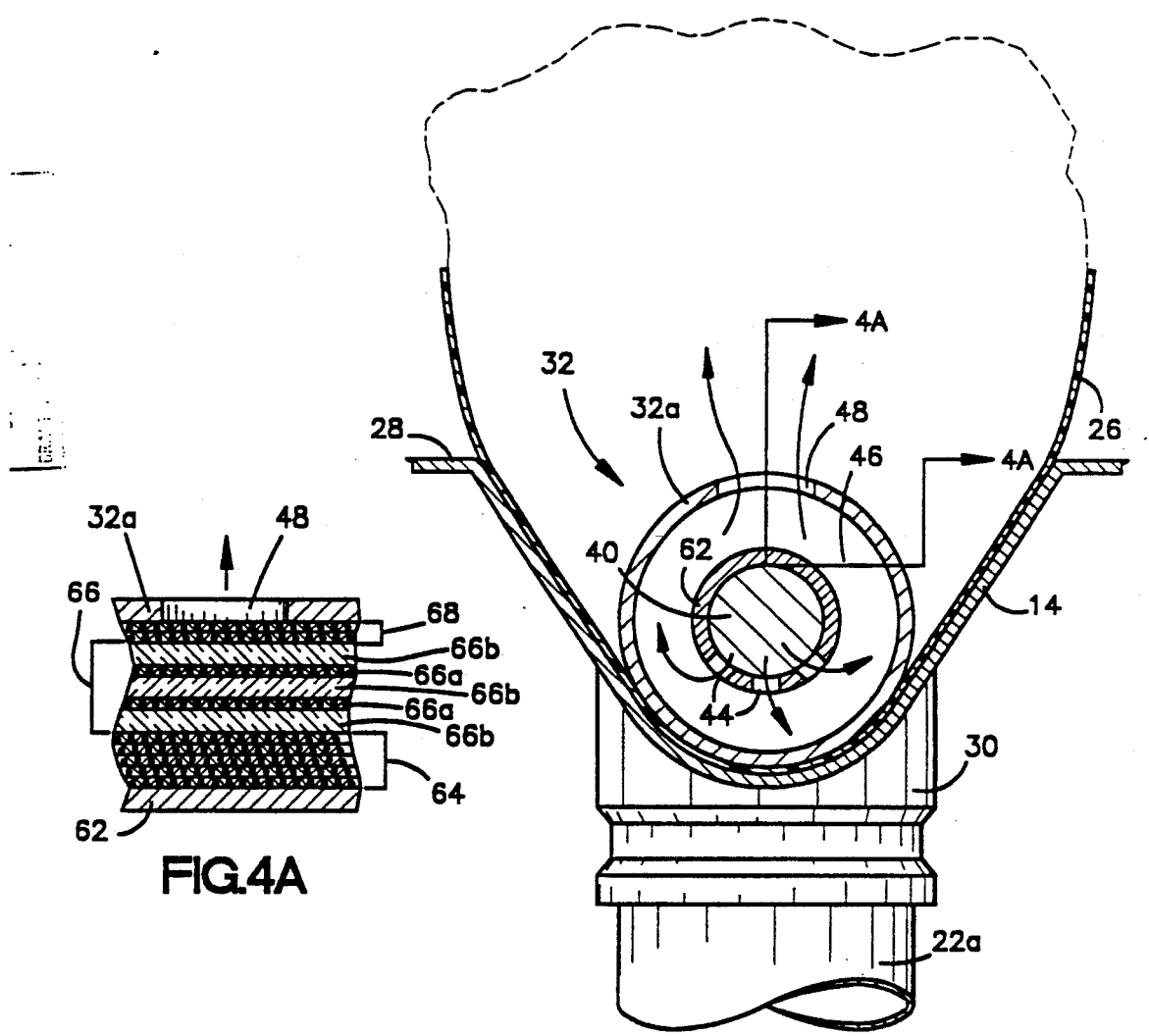
FIG. 4A
FIG. 4
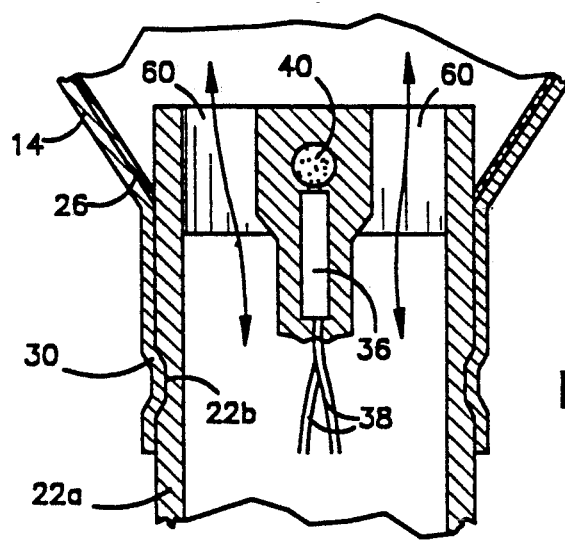
FIG. 5

LINEAR BILATERAL INFLATOR MODULE

TECHNICAL FIELD

The invention relates generally to pyrotechnic inflator devices for use with motor vehicle passenger passive restraint assemblies and, more particularly, to a modularized linear bilateral gas generator device capable of supplying a passenger air bag with at least two zones of differential pressure during inflation thereof.

BACKGROUND OF THE INVENTION

Thousands of people are killed or injured annually in automobile accidents wherein the vehicle driver and/or passengers are thrown forward as a result of the initial, i.e., primary, collision so as to impact against solid surfaces within the interior of the vehicle. As a result, passive restraint systems adapted for use with such vehicles have been developed for the purpose of reducing or eliminating these injuries and/or deaths.

One system which has been extensively investigated senses rapid vehicle deceleration, such as that which occurs upon a primary impact between an automobile and, for example, another vehicle. Upon receipt of a signal from the sensor, the system initiates inflation of an expandable passive restraint prior to the occurrence of any secondary collision between these individuals and the interior of the car. This restraint is interposed between the interior surface of the automobile and one or more occupants of the vehicle. The airbag restraint must therefore be inflated within milliseconds of the primary impact in order to ensure that the vehicle occupants' forward motion is arrested before injury occurs due to the secondary collisions against the adjacent solid interior surfaces.

Moreover, it is additionally desirable to ensure deflation of the restraining device as soon as the force of a crash is expended, so that the occupant(s) do not thereafter become trapped within the vehicle subsequent to the collision. In order to meet such criteria, specifications have been established whereby the expandable bag should be sufficiently inflated to restrain a vehicle occupant in about 30–60 milliseconds after initiation, with substantial deflation occurring after about 100 milliseconds.

Normally, such systems are activated by an inertial sensor switch responsive to the primary crash impact. The activation of this switch, in turn, results in the flow of a volume of gas sufficient to inflate a collapsed bag into a protective position in front of the driver or passenger. The inflating gas may be supplied from a source of compressed air or other compressed gas, such as that which is disclosed in Chute, U.S. Pat. No. 3,411,808 and Wissing et al., U.S. Pat. No. 3,413,013, and a number of other patents in the crash restraint field. Numerous other prior art patents (e.g., U.S. Pat. No. 3,880,447 to Thorn et al.; U.S. Pat. No. 4,068,862 to Ishi et al.; U.S. Pat. No. 4,711,466 to Breed; and U.S. Pat. Nos. 4,547,342; 4,561,675 and 4,722,551 to Adams et al.), disclose a system wherein the bag is inflated by igniting a pyrotechnic propellant composition and directing the gaseous combustion products produced thereby directly into the bag.

The first technique discussed above for inflating an air bag, i.e., utilizing a volume of compressed gas, requires a reservoir of such gas stored at a very high pressure, which may be discharged into the bag as soon as an impact is sensed by the inertial sensor switch. In order to ensure a sufficient volume of gas for inflating a motor vehicle air bag, however, a relatively large reservoir, at pressures of 3000 psi or more, is required. Moreover, to open the feed valve in the very short time interval required for ensuring the safety of the vehicle occupants, explosive arrangements are normally employed for bursting a diaphragm or cutting through a structural portion of the reservoir. As may be imagined, such explosive arrangements have significant inherent safety problems, such as the production of shrapnel by the explosion, as well as a propensity to promote hearing damage among the vehicle occupants due to the relatively high sound level reached within the passenger compartment as a result of the explosion. The psychological effect upon the vehicle occupants of having such explosives on board the automobile also cannot be ignored.

The gas bottle, i.e., reservoir, technique for inflating an air bag also suffers from a further disadvantage in that the gas pressure is highest at the commencement of bag deployment and decreases as a function of time as the gas in the storage reservoir is depleted. Moreover, the pressure/time history of such pressurized gas inflator devices is difficult if not impossible to control at reasonable cost and reliability.

In addition, the adiabatic cooling of the gas, as it expands from a storage condition of elevated pressure to the nearly ambient pressure of the inflatable bag, reduces the effective volume of the gas available for inflating the bag. This cooling effect thus requires the manufacturer of the device to provide a total gas storage volume significantly greater than that which would be required if the gas was initially stored at an elevated temperature. Furthermore, a minor leak can result in all of the gas being lost during the extended interim period that the passenger restraint system must remain in the automobile prior to any crash.

The second technique discussed above, employing a pyrotechnic gas generator, i.e., inflator device (these terms are used interchangably herein), utilizes a rapidly burning solid propellant composition stored within the inflator for producing a substantial volume of a hot gaseous product, which is then directed into an inflatable airbag. Some compositions are available which produce a sufficiently low temperature combustion gas such that the gas may be fed substantially directly into the bag without danger to the vehicle's occupants. Other systems produce a high temperature combustion product, requiring means for cooling the gas before it is introduced into the bag.

Many forms of gas generators or inflators utilizing combustible solid fuel gas generating compositions for the inflation of crash protection, i.e., "air bag", restraints, are known in the prior art. Commonly encountered features among such devices utilized for this purpose include: (1) an outer metal housing, e.g., of steel or aluminum, (2) a gas generant composition located within the housing, (3) means to ignite the gas generant responsive to a signal received from a sensor positioned at a location removed from the inflator, and (4) means to filter and to cool the gas, positioned between the propellant composition and a plurality of gas discharge ports or orifices defined by the generator housing.

Such pyrotechnic gas generators must be capable of withstanding enormous thermal and mechanical stresses for a short period during the gas generation process. Thus, most inflators that have been and are currently being used with automobile air bag devices are commonly fabricated using heavy gauge steel for the casing and other structural housing components, with these components being joined together by, for example, threaded screws, roll crimping or welding. The recent emphasis on weight reduction for the purpose of fuel conservation in motorized vehicles has, however, created a need and a demand for a lighter weight inflation system. One example of such a system is illustrated in U.S. Pat. No. 4,547,342 to Adams et al. disclosing an aluminum driver's side inflator unit.

Moreover, as is well understood by those practicing in this art, pyrotechnic inflators such as those described above may be fabricated and/or adapted in a variety of different configurations depending upon the particular response characteristics required for the intended application. One particularly important consideration in this regard is as to whether the inflator unit is to be mounted upon the steering wheel, in order to restrain the vehicle operator, or whether it is intended to protect, for example, the front seat passengers. In the latter case, the device is normally installed within the vehicle's dashboard. A different set of requirements must be met depending upon which mode of use is intended.

An inflator unit intended for installation on the driver's side, e.g., within the steering assembly, of an automobile must be smaller in size than a passenger side unit to enable it to fit within the steering wheel. It must additionally generate a gaseous combustion product up to two times faster than a passenger side unit due to the minimal separation between the driver and the steering wheel in comparison to the available space between the body of a passenger within the vehicle and the vehicle's dashboard. Moreover, a passenger side inflator device is required to produce up to four times as much gas as a driver's side inflator to completely inflate the correspondingly larger passenger side air bag. This increase in bag size is necessitated due to the relatively larger volume of space within the vehicle in which the passenger may be found, as opposed to the driver who is "locked" into a position behind the steering wheel. Numerous examples of such passenger side inflator devices are known in the prior art, such as that which is disclosed, for example, in U.S. Pat. No. 4,005,876 to Jorgensen et al.

An important additional consideration which must be addressed when designing a passenger side inflator device for installation within a motor vehicle is the presence of small children, either seated upon the lap of an adult passenger or located in a standing position between the dashboard of the vehicle and the front seat. In either case, it has been recognized that such children are liable to an increased risk of injury, notwithstanding the presence of an inflatable passive restraint device, due to the minimal degree of separation between the child's body and the air bag. This leads to a relative increase in the speed with which such children impact upon the passenger side air bag, thus greatly increasing their risk of injury in the event of a collision. Applicant is not aware of any apparatus or methodology available at present which is designed to prevent such injuries and/or deaths suffered by young children positioned within the vehicle as described above.

SUMMARY OF THE INVENTION

It is thus an object of the present invention to provide a motor vehicle passive safety device adapted for increased protection of minor passengers positioned either upon the lap of an adult passenger or standing on the floor of the vehicle between the front seat and the dashboard.

It is a further object of the invention to provide a pyrotechnic inflator device configured for installation within a motor vehicle dashboard and adapted for operative association with an inflatable passive restraint safety device as described above.

It is a still further object of the invention to provide a linear bilateral inflator device having two combustion chambers, one at each end of the inflator, joined at a central ignition zone, wherein one combustion chamber is capable of generating gas at a pressure substantially different from that provided by the other combustion chamber.

The subject inflator is thus capable of providing an inflatable passenger side air bag with gaseous combustion products introduced into different zones thereof at a variety of differing pressures In this manner, there may be provided an air bag portion of a passenger passive safety device which, upon inflation, is softer at the bottom, i.e., in the zone where a small child, positioned as described above, would be expected to impact, than at the top, which is where an adult seated on the passenger side of the front seat would make contact.

It is another object of the present invention to provide a passenger side pyrotechnic inflator device constructed of a durable, lightweight material, such as aluminum, titanium or certain stainless steels (e.g., 201 or 304 stainless steel) in order to reduce the weight of the device in comparison to models currently produced utilizing relatively heavy steel components.

The present invention thus comprises a modularized linear inflator device having a cylindrical combustion chamber positioned in a horizontal plane at both terminal ends, wherein these chambers are adapted for providing a sufficient volume of a gaseous combustion product to substantially inflate a motor vehicle passenger passive restraint within 30-60 milliseconds after an initial collision involving the vehicle. A T-shaped central portion of the inflator, located between the combustion chambers and forming a zone of attachment therefor, provides support for the combustion chambers and, in addition, houses ignition means for initiating combustion of the main propellant charge located within the combustion chambers. The lower leg of this central support is configured as a tubular extension projecting substantially perpendicularly to the longitudinal axis of the horizontally disposed combustion chambers.

In one embodiment of the invention, this extension may be joined, by means of a fitting, for example, to a conduit routed through either the firewall or the floorboards of the vehicle in order to permit a reciprocal gas flow into and out of the air bag through the inflator upon actuation of the inflator.

In the present invention, the entire inflator is completely enclosed within the passenger air bag. This arrangement eliminates the need for fasteners in attaching the bag to the inflator Bag retention is thus accomplished by providing a bead at the mouth of the bag which is simply trapped in place between the inflator and the base plate of the module.

One embodiment of the present invention includes the use of differing amounts of propellant within each of the combustion chambers in order to vary the amount of gaseous product produced. Alternately, two different propellant compositions, capable of generating differing amounts of gaseous combustion products, may also be utilized in equal or differing amounts within the combustion chambers.

The chamber generating the larger volume of gas may thus be oriented within the bag so as to direct its gas flow towards the upper portion thereof, where an adult passenger would be expected to make contact. Conversely, the remaining chamber, adapted by means of its different or lower propellant load to generate a comparatively reduced amount of gaseous product in comparison to the first chamber, is aligned so as to direct the flow of gas produced thereby to the lower portion of the bag. This arrangement thus provides a softer cushion in the zone wherein a child, seated either upon the lap of an adult passenger, or standing on the floor between the dashboard and the front seat, would be expected to strike the bag, thus reducing if not eliminating the chance for serious injury and/or death to such minor passengers in the event of a collision.

BRIEF DESCRIPTION OF THE DRAWINGS

FIG. 4 is a sectional view taken along the line 4—4 in FIG. 2;

FIG. 4a is a sectional view taken along the line 4a—4a in FIG. 4; and

FIG. 5 is a sectional view taken along the line 5—5 in FIG. 3.

DETAILED DESCRIPTION OF THE PREFERRED EMBODIMENTS

Figure 1:
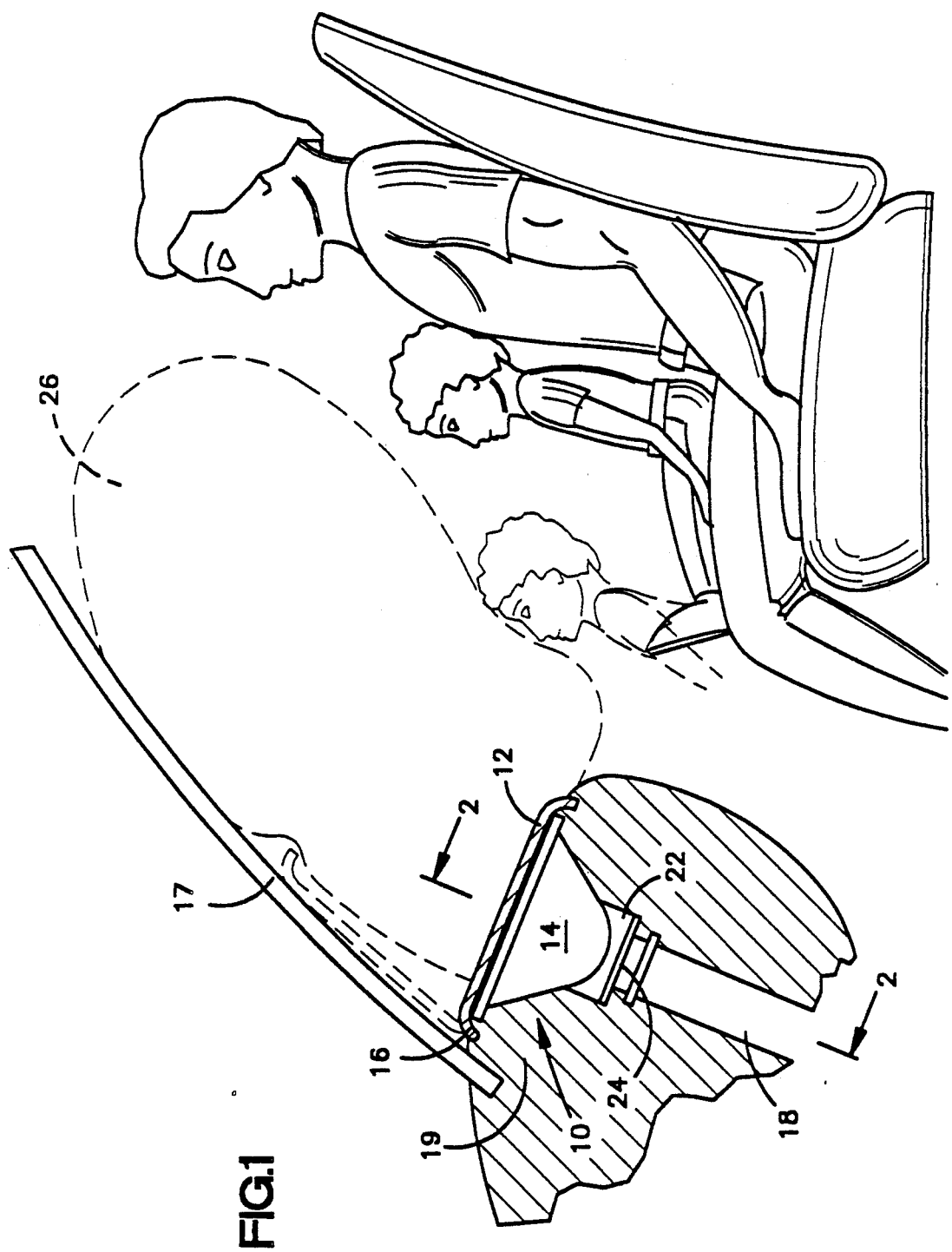
FIG. 1 is a side elevation view of a portion of a motor vehicle dashboard having installed therein a modularized passenger passive restraint assembly utilizing the bilateral linear inflator of the present invention.

Turning initially to FIG. 1 there is illustrated passenger passive restraint module assembly 10 installed within the dashboard of a motorized vehicle, e.g., an automobile. For convenience in describing the present invention, the following description is provided with regard to the installation of the subject inflator module 10 within an automobile. The invention should not, however, be considered as being limited to use with automobiles alone. Additional applications conceived by the applicant include the use of the subject inflator module in a variety of motorized vehicles such as trucks, buses, vans and even water and air-borne craft, such as boats and airplanes.

Module 10 includes, besides the inflator itself, base plate 14 which has an open end and a closed end and conduit member 18 joined by fitting 24 to a tubular extension 22 projecting substantially perpendicularly from inflator 20. Tubular extension 22, which is described below in greater detail, houses the ignition means relied upon to initiate combustion of the propellant (see, e.g., FIGS. 2, 3 and 5).

Conduit 18 is preferably passed through an aperture in the firewall or floor of the vehicle to permit the gaseous combustion products produced by the inflator to be dumped out of the passenger compartment and into the external atmosphere surrounding the vehicle. Alternatively, conduit 18 may be omitted entirely, as a result of which the gaseous contents of inflatable air bag 26 are, upon deflation of the bag subsequent to a collision, expelled back through inflator 20 and out through tubular portion 22 thereof into the passenger compartment of the vehicle.

The open end of base plate 14 is closed by cover member 12, connected at hinge 16 to vehicle dashboard 19 and forming a pivotable door thereon. Upon actuation of the inflator, cover member 12, which is not connected in any manner to module 10, is pushed upwardly against an inner surface of windshield 17 by passenger air bag 26 in order to permit the expansion and deployment of the air bag. This arrangement facilitates the installation and alignment of module 10 within dashboard 19.

Figures 2, 3:
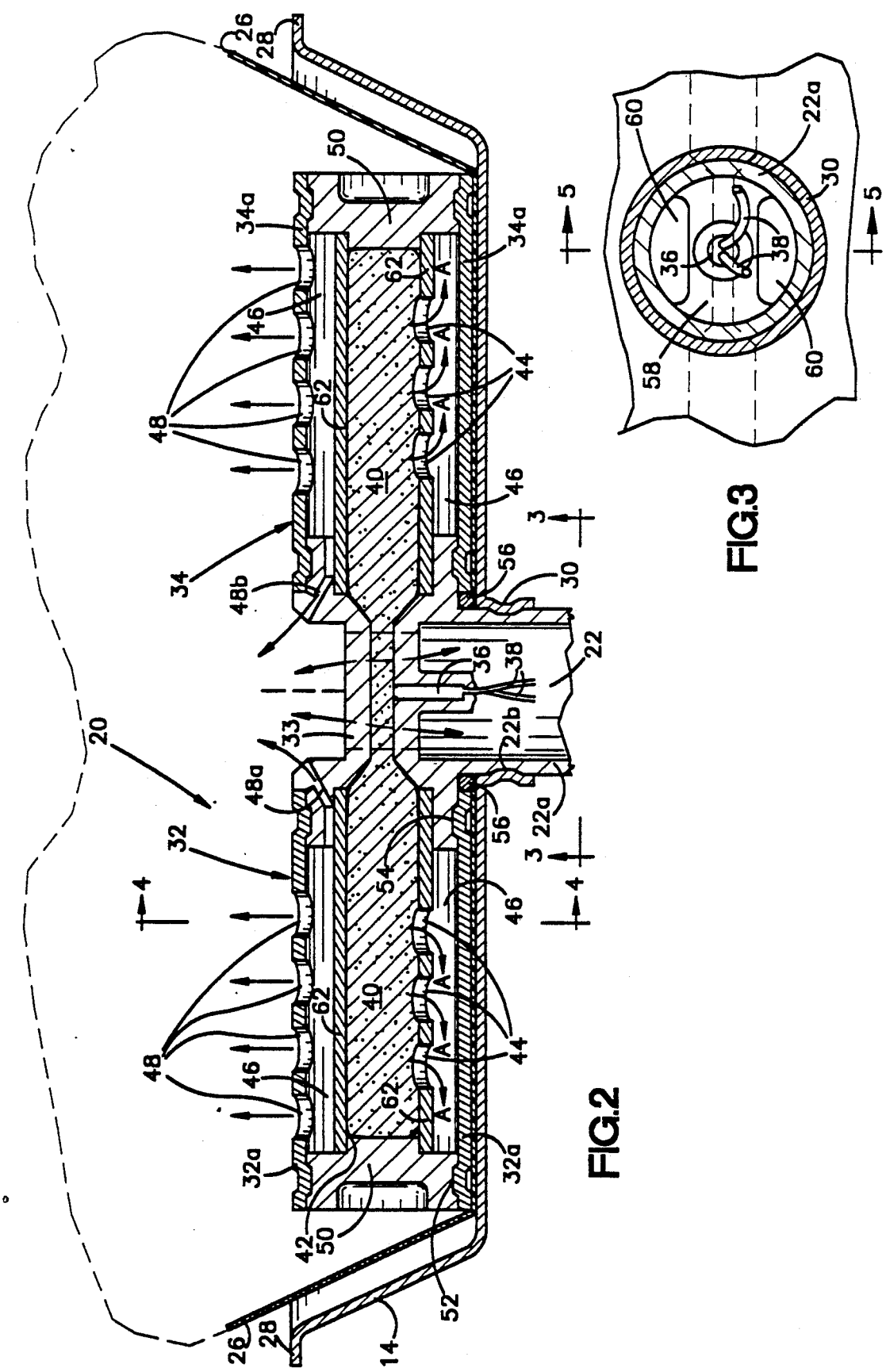
FIG. 2 is a sectional view taken along the line 2—2 in FIG. 1.
FIG. 3 is a sectional view taken along the line 3—3 in FIG. 2.

Turning now to FIG. 2, an interior view of module assembly 10 is provided, including a sectional view taken through applicant's inflator device 20. One unique feature of the present invention concerns the process by which base plate 14 is joined to inflator 20 at tubular extension 22. This connection is made through the use of a process known as "magnaforming", which process is disclosed, for example, in U.S. Pat. No. 2,976,907 to Harvey et al. (the "'907 patent"), incorporated herein by reference. The magnaforming process is well known in the prior art, although not for applications such as those disclosed herein.

In utilizing a magnaforming process such as that described in the '907 patent, a variable magnetic field is created adjacent the workpiece, e.g., in the area where skirt portion 30 of base plate 14 overlaps tubular extension 22 of inflator 20. Subsequently, one or more force impulses set up by the magnetic field are directed against skirt 30 which, prior to this operation, initially extends substantially parallel to outer wall 22a of tubular extension 22. Wall 22a is provided with an annular groove 22b extending substantially around the entire outer circumference of tubular extension 22. The effect of the force impulses is to cause a portion of skirt 30 to flow into groove 22b so as to create a bonding compression seal between mounting plate 14 and tubular extension 22, thus locking together inflator 20 and base plate 14.

Applicant has determined that the best results are obtained with the subject magnaforming technique when the temper of the metal of which the components are formed is as high as possible without being such that the metal cracks during the magnaforming process due to excessive brittleness. This ensures that applicant's device can be constructed of lightweight materials (e.g., 201 or 304 stainless steel, aluminum, or titanium) while still maintaining a sufficient degree of structural strength to withstand the forces generated within the unit during the combustion of the propellant. This is an important feature of the present invention since it is generally understood by those in the art that a reduction in vehicle weight is translatable into improved gas mileage for the vehicle.

As illustrated in FIG. 2, linear inflator 20 is provided with two cylindrical combustion chambers 32, 34, bilaterally arranged in a horizontal, i.e., linear, plane at the outer terminal ends of the inflator. A central T-shaped portion 33, located between combustion chambers 32, 34 and comprising tubular extension 22, which projects substantially perpendicularly to the said chambers, serves to support the combustion chambers. This central T-shaped support 33 also houses the ignition means for initiating combustion of main propellant charge 40 within tubular extension 22. The preferred ignition means is an electrically activated squib device 36, containing a small charge of a combustible material. Squib 36 is normally connected via electrical leads 38 to at least one remote sensing device (not shown), of a type well known in the art, located in, for example, the front bumper or side fender of the vehicle. Thus, activation of squib 36 is designed to simultaneously ignite propellant 40 stored within both combustion chambers 32, 34.

Propellant 40 may be supplied in a variety of physical forms. It may, for example, be stored within inflator 20 as a powder, or alternately, in the form of a number of tablets, ranging in size from an aspirin tablet to approximately that of an Alka-Seltzer ®. Although either arrangement will work equally well, the latter, i.e., tablet, form is preferred because of the ease with which such tablets may be handled in comparison to the use of bulky and cumbersome powders. Moreover, in order to prevent propellant 40 from leaking out of combustion chambers 32, 34 prior to ignition, propellant 40 is enclosed within an outer packaging or wrapping 42. The material forming this packaging or wrapping 42 may be selected from a variety of inexpensive plastic wraps and metal foils, with the latter being preferred for use in the present invention. Not only does packaging 42 ensure that propellant 40 stays within combustion chambers 32, 34, but it also prevents the propellant from coming into contact with moisture from the surrounding environment which may negatively affect the inflator's combustion capabilities due to caking or agglomeration of the propellant particles.

A variety of compositions, well known to those of ordinary skill in the art, may be utilized as propellants for inflator 20 described herein. Applicant prefers for use in the presently disclosed inflator the various compositions described in U.S. Pat. No. 3,895,098 to John F. Pietz, issued July 15, 1975 and reissued as U.S. Pat. No. Re. 32,584 on Jan. 26, 1988 and entitled METHOD AND COMPOSITION FOR GENERATING NITROGEN GAS. The fastest burning (and therefore preferred) propellant compositions are those propellants taught by the subject patent which comprise a mixture of sodium azide and copper oxide.

Alternately, compositions substituting nickel and iron oxidizers may be utilized, but these generants, although capable of a slightly higher effective gas output than the $CuO/NaN_3$ mixture described above, often require the addition of an ammonium perchlorate burn rate enhancer to reach their full potential, as disclosed in U.S. Pat. No. 4,604,151 issued on May 8, 1986 to Knowlton et al., entitled METHOD AND COMPOSITION FOR GENERATING NITROGEN GAS INCLUDING AMMONIUM PERCHLORATE CATALYST. A large number of different generant compositions are operable within applicant's inflator device 20, however, and the present invention should not be limited solely to the use of the compositions disclosed above.

In a further alternate embodiment of the present invention, the propellant may be molded or extruded into a single porous grain conforming to the volume and the shape of combustion chambers 32, 34. An important feature to consider with the use of such a porous propellant grain, however, is to ensure that the grain is formed having a sufficient degree of porosity to provide a sufficient volume of gas to inflate an air bag within, for example, the 30–60 millisecond period described above. Such a porous propellant grain is disclosed and claimed in U.S. Pat. No. 4,758,287 to John F. Pietz entitled POROUS PROPELLANT GRAIN AND METHOD OF MAKING SAME.

An important additional feature of the present invention is the ability of inflator 20 to operate with a comparatively reduced amount of propellant 40 in one combustion chamber, e.g., 32, with a proportionately larger amount of either the same or a different propellant in the remaining combustion chamber, i.e., 34. Upon installation of module 10 in vehicle dashboard 19, inflator 20 may be aligned such that the gaseous combustion products from chamber 32 (having the relatively reduced amount of propellant) are directed to the lower portion of passenger air bag 26, where a child is most likely to impact upon the bag in the event of a collision involving the automobile, whereas the remaining combustion chamber, (i.e., 34) containing a comparatively greater amount of propellant, is aligned so as to direct the gas produced thereby to the middle and upper portions of the bag. Thus, these areas become comparatively firmer and are therefore able to absorb an adult's relatively greater weight during a collision.

The gases and molten particulates produced as a result of the ignition and subsequent combustion of propellant 40 exit cylindrically shaped combustion chambers 32, 34 through a first set of diffuser ports 44 which provide fluid communication between the combustion zone, i.e., where propellant 40 is located, and filtration zone 46 (illustrated in a representational view in FIG. 2) which anularly surrounds the combustion zone. Filtration zone 46 comprises a number of anularly disposed layers of wire mesh screen and inert inorganic spacer pads, described below in detail with reference to FIG. 4a. Thus, filtration zone 46 serves a two-fold purpose: (1) the removal of a substantial majority of molten particulates from the gas stream so that they do not enter and impact directly upon the inner surface of bag 26, thus possibly burning through the fabric of the bag with potentially disastrous consequences for the vehicle occupants and, (2) as a heat sink to cool the gas to a temperature approaching ambient such that, in the improbable event of a bag failure, the vehicle occupants are prevented from contact with the dangerously hot gases produced by the combustion of propellant 40.

As represented by curved arrows A in FIG. 2, the gases expelled from the combustion zone within each of combustion chambers 32, 34 exits these zones at an angle of substantially 180° from a second set of diffuser ports 48 communicating with the interior of bag 26. This arrangement forces the gas to take a circuitous clockwise or counter clockwise route (as shown by arrows A) around the inner arcuate surface of each cylindrical combustion chamber, 32, 34, before exiting inflator 20 through ports 48, thus making the most effective use of the heat sink capacity of filtration zone 46 while also providing the maximum possible degree of filtration.

To seal the outer ends of inflator 20, end caps 50 are inserted into the open outer ends of combustion chambers 32, 34. Caps 50 are preferably U-shaped and stamped from a lightweight material, e.g., aluminum, in order to minimize their weight and therefor the weight of inflator 20. To maintain end caps 50 in position when inflator 20 is pressurized during operation, outer cylindrical walls 32a and 34a of the corresponding combustion chambers are magnaformed into an annular groove 52 extending entirely around the outer periphery of each cap 50. In addition, along the inner end of both chambers 32 and 34, i.e., adjacent T-shaped support 33 containing squib 36, walls 32a, 34a are magnaformed into a second set of corresponding grooves 54 formed within the head of the "T" in order to place chambers 32, 34 in operative association with squib 36.

An additional novel feature of the invention concerns the fact that inflator 20 is entirely enclosed within bag 26. This arrangement eliminates the need for cumbersome fasteners for attaching bag 26 to inflator 20 or to base plate 14. Bag retention is thus accomplished by providing bead 56 within the mouth of bag 26 and then simply trapping the bead in place between base plate 14 and cylindrical walls 32a, 34a defining, respectively, combustion chambers 32, 34 when plate 14 is magnaformed onto tubular extension 22.

Turning now to FIG. 3, there is illustrated a rear plan view through tubular extension 22 of the means for supporting squib 36 within inflator 20. As may be discerned from the illustration, squib 36 is seated within an aperture defined by cross member 58 which bisects tubular extension 22. In one embodiment of the invention, the aperture and the squib base may be provided with corresponding male and female threads with squib 36 thus being screwed into the aperture. Alternately, in a different embodiment, squib 36 is "potted" within the aperture with the use of an epoxy composition. In the preferred embodiment, squib 36 is simply crimped into place within the aperture, thus obviating the need for threads or adhesives. Electrical leads 38 extend below member 58 as shown and are remotely connected, as noted above, to means for sensing a sudden deceleration and/or collision involving the vehicle.

Member 58 defines corresponding gas passages 60 adapted to permit a reciprocal fluid flow into and out of air bag 26 through inflator 20. This supplemental volume of gas, which is drawn into bag 26 by the aspirating effect created due to high velocity gases exiting inflator 20 through ports 48, especially angled ports 48a, b (see, e.g., FIG. 2), serves to speed the inflation of the bag and to further cool the gases supplied by the combustion of propellant 40.

In addition, during deflation of bag 26, any toxic material present within airbag 26 may be directed back through the inflator through passages 60 and out of the vehicle through conduit 18. This arrangement thus avoids following the commonly utilized technique of venting these gases through a vent hole in the fabric of bag 26 into the interior of the passenger compartment.

FIG. 4 is provided to more clearly display the flow path of the gases within inflator 20, previously discussed with regard to FIG. 2. These gases (represented by the arrows) flow arcuately through filtration zone 46 (illustrated in a representational view) in both clockwise and counterclockwise paths and eventually exit into air bag 26. As illustrated with respect to one representative combustion chamber (i.e., 32), the gas produced by the combustion of propellant 40 exits the combustion zone of chamber 32 through a first set diffuser ports 44 which are perforated through wall 62 defining the said combustion zone. Wall 62 is simply trapped in place without any requirement that it be mechanically attached to the inflator housing. Upon exiting first diffuser ports 44, the hot gas, containing molten particulates, enters filtration zone 46 wherein it is deflected from outer cylindrical unperforated wall 32a forming the inflator housing. As a result of this arrangement, the gas is forced to travel 180° in an arcuate path around the inner surface of the combustion chamber, whereupon it flows into bag 26 through a second set of diffuser ports 48. Thus, the gas is both cooled and filtered as it passes through filtration zone 46, described below in further detail.

FIG. 4a provides a partial sectional view through filtration zone 46 of FIG. 4 and illustrates the preferred filtration arrangement located within each combustion chamber 32, 34. Applicant recognizes that a number of variations are possible with regard to the filtering arrangement utilized in the present invention and should therefore not be restricted to the use of the preferred structure described herein. As may be seen from the illustration, the core, i.e., the inner portion of filtration zone 46 is comprised of a number (preferably 5) of concentric layers 64 of a metal screen material, preferably of 28 mesh size, with the innermost layer positioned directly over and adjacent the first set of diffuser ports 44.

Extending circumferentially outwardly of screens 64 is a sandwich 66 comprised of several layers of metal screen 66a with alternating layers of an inert, inorganic ceramic fiber pad 66b formed from a mixture of alumina oxide and silica oxide. Pads 66b are sold under the trade name FiberFrax® by Sohio Carborundum, Inc. of Niagara Falls, N.Y., a division of the Standard Oil Corporation. Ceramic pads 66b, being more dense than the 28 mesh screen, trap even the finest particulates traveling within the gas flow. Finally, a double layer of 28 mesh screen 68, located adjacent the inner arcuate surface of cylindrical wall 32a forming the housing of combustion chamber 32, abuts against the inner aspect of the second set of diffuser ports 48 to serve as a final check on the expulsion of unwanted particulate matter present within the gas. As noted above, the filtration arrangement is reproduced in the other combustion chamber 34 as well.

FIG. 5 generally illustrates the gas passage arrangement described above with regard to FIG. 3, except that FIG. 5 represents a sectional view taken along the vertical axis of tubular extension 22 in FIG. 3. Since the structure is unchanged between those two figures, i.e., only the perspective is different, the structural components comprising this aspect of the invention have been designated with the same identification number in both figures. The solid arrows represent the reciprocal flow of gas into and out of bag 26.

While it is apparent that the invention herein disclosed is well calculated to fulfill the objectives stated above, it will be appreciated that numerous modifications and embodiments may be devised by those skilled in the art, and it is intended that the appended claims cover all such modifications and embodiments as fall within the true spirit and scope of the present invention.

I claim:

1. A motor vehicle passenger passive restraint module comprising:
    (a) means for mounting a pyrotechnic gas inflator device within a dashboard portion of said vehicle, said inflator device capable of producing a sufficient amount of a gaseous combustion product within a sufficient time to substantially deploy an inflatable passenger air cushion located in contact relation therewith within an interval between a primary collision involving said motor vehicle and an object external thereto and a secondary collision between at least one passenger within said motor vehicle and an interior portion thereof;
    (b) a pyrotechnic gas inflator device installed within said mounting means and secured thereto by a first structural seal formed therebetween, said inflator device comprising i) first and second combustion chambers positioned substantially horizontally at, respectively, a first end and a second end of said inflator; and ii) a T-shaped central support member located between said first and said second combustion chambers and secured, at a first side thereof, to said first combustion chamber and, at a second side thereof, to said second combustion chamber, by structural seals formed between said support member and a corresponding first inner end of each said combustion chamber, said support member further comprising a tubular stem portion projecting substantially perpendicularly to a longitudinal axis of said first and said second combustion chambers, said stem portion containing ignition means for initiating combustion of a pyrotechnic gas-generating composition stored in both said first and said second combustion chambers; and (c) an expandable passenger air bag positioned in surrounding relation to said inflator device, said air bag secured, at a mouth portion thereof, between said inflator device and said mounting means, wherein said first and said second combustion chambers are each adapted to supply differing amounts of a gaseous product, produced due to the combustion of said pyrotechnic gas-generating composition stored therein, so as to create at least two zones of differential pressure within said expandable passenger air bag.

2. The module of claim 1 wherein said mounting means is a base plate member adapted for installation within an aperture defined by a dashboard portion of said vehicle by fastener means for securing said base plate within said aperture, said base plate member comprising skirt means formed integral with a lower portion thereof, said skirt means extending substantially perpendicularly from said lower portion and defining an aperture within said base plate member, wherein said tubular stem portion of said pyrotechnic as inflator device extends at least partially through said aperture upon formation of said first structural seal.

3. The module of claim 2 wherein an outer wall of said tubular stem portion is grooved to facilitate formation of said first structural seal between said base plate member and said inflator device.

4. The module of claim 3 wherein said first structural seal is created by magnaforming at least a portion of said skirt means upon said base plate member into said groove on said tubular stem portion of said inflator device.

5. The module of claim 4 wherein a first one of said first and said second combustion chambers contains a greater amount of said pyrotechnic gas generating composition relative to a second one of said chambers and wherein the gaseous product produced within said chamber having said relatively greater amount of said composition is directed toward a first zone of said expandable passenger air bag while the gaseous product produced within the remaining one of said chambers, containing a relatively lesser amount of said composition, is directed toward a second zone of said air bag.

6. The module of claim 5 wherein said first zone is located in an upper portion of said passenger air bag and said second zone is located in a lower portion of said air bag, such that said lower portion is relatively less pressurized than said upper portion of said air bag.

7. The module of claim 1 wherein said inflator device is fabricated from a relatively lightweight corrosion-resistant, high tensile strength material.

8. The module of claim 7 wherein said relatively lightweight, corrosion-resistant, high tensile strength material is selected from among aluminum, titanium and stainless steel.

9. The module of claim 1 wherein said ignition means comprises an electrically actuated squib.

10. The module of claim 9 wherein said squib is secured within said central support member of said inflator device by a seal formed by crimping a base portion of said squib within an aperture defined by a structural member situated within and extending across said tubular stem portion thereof.

11. The module of claim 1 wherein said first and second combustion chambers each comprise:

(a) a cylindrically shaped propellant chamber extending along substantially an entire inner longitudinal axis of said combustion chamber and communicating, through a first inner end of said chamber in contact relation with said central support member of said inflator device, with a similarly disposed propellant chamber in an other one of said combustion chambers such that, upon actuation of said ignition means, said pyrotechnic gas-generating composition in both said first and said second combustion chambers is ignited substantially simultaneously;

(b) an anularly shaped filtration chamber disposed outwardly adjacent said cylindrical propellant chamber and positioned in substantially circumjacent relation thereto, said filtration chamber comprising a plurality of means for cooling and filtering said gaseous combustion products produced upon ignition of said pyrotechnic gas-generating composition;

(c) a cylindrical outer wall portion, substantially surrounding said annular filtration chamber along a longitudinal axis thereof, said wall portion being adapted to form an outer housing of said combustion chamber; and (d) an end cap member for sealing a second outer peripheral end of said combustion chamber, said cap member being secured within said cylindrical outer wall portion by a second structural seal formed therebetween, said second seal created by magnaforming a portion of said cylindrical outer wall into a grooved outer surface of said end cap member.

12. The module of claim 11 wherein said first and said second combustion chambers are each joined at their first inner end to, respectively, a first end and a second end of said central support member of said inflator device by respectively, a third and a fourth structural seal, said third and fourth seals formed by magnaforming a portion of said cylindrical outer wall of each said combustion chamber to a corresponding grooved outer wall portion on said central support member.

13. A motor vehicle passenger passive restraint module for preventing, in the event of a primary collision involving said vehicle, the occurrence of a secondary impact between a passenger within said vehicle and a solid interior surface thereof, said module comprising:

(a) a base plate member adapted for installation within an aperture defined by a dashboard portion of said vehicle by fastener means for securing said base plate within said aperture, said base plate comprising a skirt formed integral with a lower portion thereof, said skirt extending substantially perpendicularly from said lower portion and defining an aperture within said base plate member;

(b) a pyrotechnic inflator device installed within said base plate and secured thereto by a first structural seal formed therebetween, said inflator device comprising 1) first and second combustion chambers positioned substantially horizontally at, respectively, a first end and a second end of said inflator, each said combustion chamber comprising i) a cylindrically shaped propellant chamber extending along substantially an entire inner longitudinal axis of said combustion chamber and communicating, through a first inner end of said chamber in contact relation with a central support member of said inflator device, with a similarly disposed propellant chamber in an other one of said combustion chambers such that, upon actuation of ignition means for initiating combustion of a pyrotechnic gas-generating composition stored therein, said pyrotechnic gas-generating composition in both said first and said second combustion chambers is ignited substantially simultaneously;

ii) an anularly shaped filtration chamber disposed outwardly adjacent said cylindrical propellant chamber and positioned in substantially circumjacent relation thereto, said filtration chamber comprising a plurality of means for cooling and filtering said gaseous combustion products produced upon ignition of said pyrotechnic gas-generating composition;

iii) a cylindrical outer wall portion, substantially surrounding said annular filtration chamber along a longitudinal axis thereof, said wall portion being adapted to form an outer housing of said combustion chamber; and iv) an end cap member for sealing a second outer peripheral end of said combustion chamber, said cap member being secured within said cylindrical outer wall portion by a second structural seal formed therebetween, said second structural seal created by magnaforming a portion of said cylindrical outer wall into a grooved outer surface of said end cap member;

2) a T-shaped central support member located between said first and said second combustion chambers, said support member having first and second opposed grooved sides and secured, at said first side thereof, to said first inner end of said first combustion chamber and, at said second side thereof, to said first inner end of said second combustion chamber by, respectively, a third and a fourth gas-tight structural seal formed therebetween, said third and fourth gas-tight seals created by magnaforming a portion of said cylindrical outer wall of, respectively, said first and said second combustion chamber into a corresponding one of said first and second grooved sides of said inflator support member, said support member further comprising a tubular stem portion projecting at least partially through said aperture in said base plate member and aligned substantially perpendicularly to a longitudinal axis of said first and said second combustion chambers, said stem portion being grooved along an outer wall surface thereof to facilitate formation of said first structural seal between said base plate member and said inflator device and having installed therein an electrically activated squib for initiating combustion of said pyrotechnic gas-generating composition stored in both said first and said second combustion chambers, said first structural seal being created by magnaforming at least a portion of said skirt upon said base plate member into said groove on said tubular stem portion of said inflator device, and (c) an expandable passenger air bag positioned in surrounding relation to said inflator device, said air bag secured, at a mouth portion thereof, between said inflator device and said base plate member;

wherein a first one of said first and said second combustion chambers contains a greater amount of said pyrotechnic gas-generating composition relative to a second one of said chambers and wherein the gaseous combustion products produced by said combustion chamber having said greater amount of said composition are directed towards an upper portion of said expandable passenger air bag while the combustion products produced by the remaining combustion chamber, containing a relatively lesser amount of said composition, are directed towards a lower portion of said bag, so as to provide at least two zones of differential gas pressure within said bag upon actuation of said inflator device, wherein a lower portion of said bag is relatively less pressurized than an upper portion thereof.

14. The module of claim 13 wherein said pyrotechnic gas-generating composition is discretely packaged within container means for preventing contamination of said gas-generating composition within the propellant chamber of each said combustion chamber.

15. The module of claim 14 wherein said container means is a hermetically sealed packet formed of a material selected from plastic and a metal foil.

16. The module of claim 15 wherein said packet is sealed by means selected from fasteners, adhesives and heat.

17. The module of claim 13 wherein said pyrotechnic gas-generating composition comprises an alkali metal or an alkaline earth metal azide and at least a stoichiometric amount of a metal oxide.

18. The module of claim 17 wherein said pyrotechnic gas-generating composition comprises a mixture of sodium azide and at least a stoichiometric amount of copper oxide.

19. The module of claim 17 wherein said pyrotechnic gas-generating composition is present within said propellant chamber portion of each said combustion chambers in a form selected from among:

(a) a powder;

(b) a quantity of pressed tablets; and (c) a single porous grain having a plurality of randomly oriented radially and longitudinally interconnected porous channels of various diameters extending entirely through said grain to increase the burning surface thereof.

20. The module of claim 13 wherein each said propellant chamber is defined by an inner cylindrical boundary wall which is trapped in place within said respective combustion chamber, said inner boundary wall being provided with a first set of diffuser ports providing fluid communication between said propellant chamber and said filtration chamber within each said combustion chamber.

21. The module of claim 20 wherein each said combustion chamber further comprises a second set of diffuser ports defined by said wall comprising said outer housing of said chamber, said second set of diffuser ports providing fluid communication between said filtration chamber and an interior portion of said passenger air bag and further being aligned in at least one substantially linear row positioned substantially 180° out of alignment with said first set of ports, such that the gaseous combustion product flowing out of said propellant chamber upon ignition of said pyrotechnic gas-generating composition through said first set of diffuser ports is directed in an arc of substantially 180° through said filtration chamber prior to entering said air bag through said second set of diffuser ports in order to maximize a degree of cooling and filtration of said products thus obtained.

22. The module of claim 21 wherein said filtration chamber comprises a plurality of layers of a metal screen material installed in annular surrounding relation to said propellant chamber, wherein said screen material is adapted to remove substantially all particulate material from said gaseous combustion products and to cool said gas prior to its entry into said air bag.

23. The module of claim 22 wherein said metal screen material is of substantially the same mesh size throughout the entire filtration chamber.

24. The module of claim 22 wherein said metal screen material gradually diminishes in relative mesh size from a first location adjacent said propellant chamber to a second location adjacent an inner surface of said wall forming said outer housing.

25. The module of claim 22 wherein said filtration chamber further comprises a plurality of layers of an inert, inorganic ceramic fiber pad interspersed among alternating layers of said screen material.

26. The module of claim 25 wherein said ceramic fiber pad comprises a mixture of alumina oxide and silica oxide fibers.

27. The module of claim 26 wherein said filtration chamber comprises, from a first location adjacent said inner cylindrical boundary wall defining said propellant chamber to a second location abutting against an inner surface of said wall forming said inflator housing:
    (a) a plurality of layers of a metal screen material;
    (b) a first layer of said ceramic fiber pad;
    (c) a layer of said metal screen material;
    (d) a second layer of said ceramic fiber pad;
    (e) a layer of said metal screen material;
    (f) a third layer of said ceramic fiber pad; and
    (g) a double layer of said metal screen material,
wherein each said layer, a-g, substantially overlays each preceding layer.

28. The module of claim 13 wherein said inflatable passenger air bag is provided with a bead within a mouth portion thereof for securing said bag within said module.

29. The module of claim 28 wherein said bead is trapped between said base plate and said inflator device, such that said inflator device is substantially surrounded by said air bag when said module is formed.

30. A method for differentially inflating an expandable passenger air bag, said method comprising:
    constructing a motor vehicle passenger passive restraint module comprising 1) a base plate member adapted for installation within an aperture defined by a dashboard portion of said vehicle by fastener means for securing said base plate within said aperture, said base plate comprising a skirt formed integral with a lower portion thereof, said skirt extending substantially perpendicularly from said lower portion and defining an aperture within said base plate member;
2) a linear bilateral inflator device installed within said base plate and secured thereto by a first structural seal formed therebetween, said inflator device comprising
    (i) first and second combustion chambers substantially horizontally positioned at, respectively, a first end and a second end of said inflator, each said combustion chamber comprising
    (i)(a) a cylindrically shaped propellant chamber extending along substantially an entire inner longitudinal axis of said combustion chamber and communicating, through a first inner end of said chamber in contact relation with a central support member of said inflator device, with a similarly disposed propellant chamber in an other one of said combustion chambers such that, upon actuation of ignition means for initiating combustion of a pyrotechnic gas-generating composition stored therein, said pyrotechnic gas-generating composition in both said first and said second combustion chambers is ignited substantially simultaneously;
    (i)(b) an anularly shaped filtration chamber disposed outwardly adjacent said cylindrical propellant chamber and positioned in substantially circumjacent relation thereto, said filtration chamber comprising a plurality of means for cooling and filtering said gaseous combustion products produced upon ignition of said pyrotechnic gas- generating composition;
    (i)(c) a cylindrical outer wall portion, substantially surrounding said annular filtration chamber along a longitudinal axis thereof, said wall portion being adapted to form an outer housing of said combustion chamber; and
    (i)(d) an end cap member for sealing a second outer peripheral end of said combustion chamber, said cap member being secured within said cylindrical outer wall portion by a second structural seal formed therebetween, said second structural seal created by magnaforming a portion of said cylindrical outer wall into a grooved outer surface of said end cap member,
    (ii) a T-shaped central support member interposed between said first and said second combustion chambers, said support member having first and second opposed grooved sides and secured, at said first side thereof, to said first inner end of said first combustion chamber and, at said second side thereof, to said first inner end of said second combustion chamber by, respectively, a third and fourth gas-tight structural seal formed therebetween, said third and fourth gas-tight seals created by mangnaforming a portion of said cylindrical outer wall of respectively, said first and said second combustion chamber into a corresponding one of said first and second grooved sides of said inflator support member, said support member further comprising a tubular stem portion projecting at least partially through said aperture in said base plate member and aligned substantially perpendicularly to a longitudinal axis of said first and said second combustion chambers, said stem portion being grooved along an outer wall surface thereof to facilitate formation of said first structural seal between said base plate member and said inflator device and having installed therein an electrically activated squib for initiating combustion of said pyrotechnic gas-generating composition stored in both said first and said second combustion chambers, said first structural seal between said base plate member and said inflator device being created by magnaforming at least a portion of said skirt upon said base plate member into said groove on said tubular stem portion of said inflator device, and 3) an expandable passenger air bag positioned in surrounding relation to said inflator device, said air bag secured, at a mouth portion thereof, between said inflator device and said base plate member, B. supplying a first one of said first and said second combustion chambers with a greater amount of said pyrotechnic gas-generating composition relative to a second one of said chambers;

C. installing said module within a dashboard portion of a motor vehicle and orienting said first and said second combustion chambers such that, upon ignition of said pyrotechnic gas-generating composition, the gaseous combustion products produced by said combustion chamber having said greater amount of said gas-generating composition are directed towards an upper portion of said expandable passenger air bag while the combustion products produced by the remaining combustion chamber, containing a relatively lesser amount of said gas-generating composition, are directed towards a lower portion of said bag, so as to provide at least two zones of differential gas pressure within said bag, wherein a lower portion of said bag is relatively less pressurized than an upper portion thereof; and D. igniting said pyrotechnic gas generating composition stored within said inflator device.

* * * * *

UNITED STATES PATENT AND TRADEMARK OFFICE
CERTIFICATE OF CORRECTION

PATENT NO. : 5,058,921

DATED : October 22, 1991

INVENTOR(S) : Jess Cuevas

It is certified that error appears in the above-identified patent and that said Letters Patent is hereby corrected as shown below:

Column 11, Line 41, Claim 2, delete "as" and insert --gas--.

Signed and Sealed this

Ninth Day of March, 1993

*Attest:*

STEPHEN G. KUNIN

*Attesting Officer*      *Acting Commissioner of Patents and Trademarks*